No. 868,113. PATENTED OCT. 15, 1907.
R. N. OAKMAN.
COUPLING DEVICE FOR GAS FITTINGS.
APPLICATION FILED AUG. 10, 1906.

Witnesses
T. L. Mockrael
James F. Crown

Inventor
R. N. Oakman
E. B. Clark
Attorney

UNITED STATES PATENT OFFICE.

RICHARD N. OAKMAN, OF BROOKLYN, NEW YORK.

COUPLING DEVICE FOR GAS-FITTINGS.

No. 868,113.   Specification of Letters Patent.   Patented Oct. 15, 1907.

Application filed August 10, 1906. Serial No. 330,059.

*To all whom it may concern:*

Be it known that I, RICHARD N. OAKMAN, a citizen of the United States, residing at Brooklyn, in the county of Queens and State of New York, have invented certain new and useful Improvements in Coupling Devices for Gas-Fittings, of which the following is a specification.

This invention relates to connection or coupling devices for gas fittings; and the object is to provide a device of simple and effective construction, particularly adapted for connecting air tubing to the piston chamber of a burner, in distance lighting apparatus, and the pump, also different lengths of tubing to one another.

Heretofore a hollow cone has been placed on the tube with its small end outward adjacent to the end of the tube, and with a rubber washer at its rear, enlarged end; and an internally screw threaded cap back of the cone was screwed onto a nipple in which the cone was seated. This made a large and rather clumsy joint, in which the tubing was liable to slip endwise, either into the piston chamber at the burner, or into the pump cylinder. In the device of my present invention, these difficulties are overcome and greater efficiency secured.

The matter constituting my invention is defined in the claims.

The details of construction are illustrated in the accompanying drawings, in which,—

Figure 1:
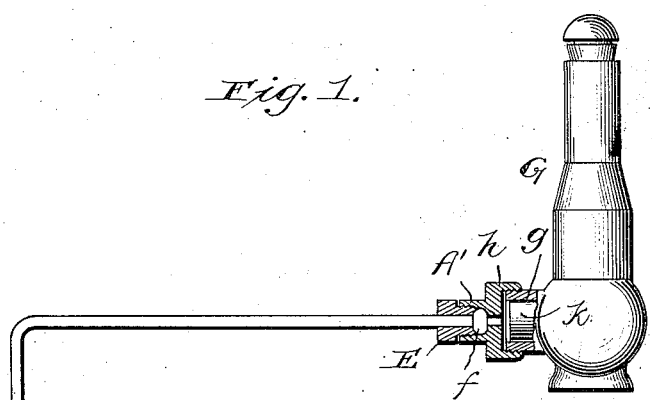
Figure 2:
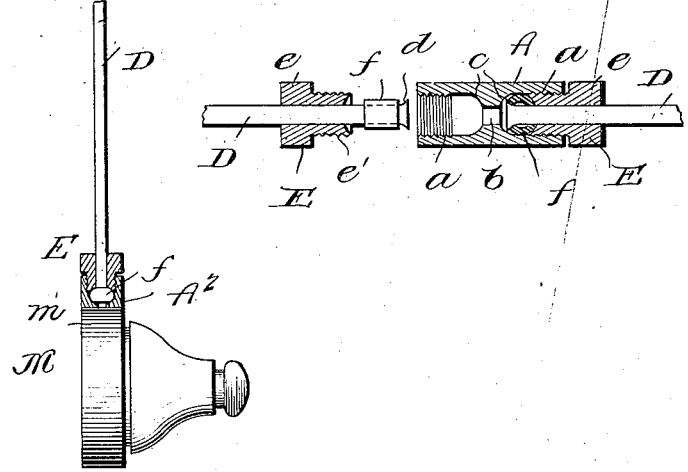

Figure 1 represents an elevation of a burner, a pump and connecting tubing with parts in section showing my coupling device. Fig. 2 represents a longitudinal section of the union or coupling joint on enlarged scale.

The coupling joint A, Fig. 2, for connecting two lengths of pipe is made with two comparatively large longitudinal openings $a$ extending inward from its opposite ends and with a connecting smaller opening $b$ so as to form annular shoulders $c$ at the inner ends of openings $a$. In order to provide shoulders $c$, the part A is made with a transverse partition $a'$ forming an integral part thereof and having the central opening $b$. The openings $a$ are screw threaded. The extremities of the tubes or pipes D are enlarged, preferably being spread or expanded, as at $d$, to bear at their outer faces upon the shoulders $c$.

Upon the tube D is placed a compressible packing or washer $f$ which may be a short section of rubber tube. Back of the packing is placed on tube D a tubular nut E having a milled head $e$ and an externally screw-threaded extension $e'$ adapted to fit into the screw threaded opening $a$.

In assembling the parts, the nut E may first be slid upon the end of tube D, the packing ring $f$ then slid thereon and then the end of tube D enlarged or spread by an expanding tool to form flange $d$. The end of tube D is now ready to be inserted into the screw threaded socket $a$ with its flange bearing upon shoulder $c$, and the nut E may be screwed down onto the packing $f$, thereby forcing it onto the spread end of flange $d$ and into the threads in socket $a$ and making a tight joint.

The same kind of a joint is used in connecting the tube D to a burner G and a pump M. The burner pillar is provided with a piston chamber $g$ containing a reciprocating piston $k$ which is to be reciprocated by air pressure or exhaustion. The end of chamber $g$ is closed by a cap $h$ having a coupling part $A^1$ to which is applied a nut E and other details of construction shown in Fig. 2. The pump M is provided with a projecting part $A^2$ to which pipe D is connected by means of the devices above described by reference to Fig. 2.

By means of the devices constructed as shown I obtain a perfectly packed union or joint, and tube D is prevented from slipping endwise, either into piston chamber $g$ or into pump cylinder $m$.

In the coupling devices heretofore used the tube was liable to slip into these chambers and cause much annoyance by interfering with the operation of the burner piston-valve and the pump piston.

My coupling device is simple and inexpensive to construct and can be quickly manipulated to connect two lengths of pipe, or connect a pipe to the burner or the pump.

Having described my invention, what I claim, and desire to secure by Letters Patent, is:—

1. A union or coupling joint for gas fittings, consisting of a tubular part having a larger and a smaller longitudinal opening providing an interior shoulder, the larger opening being screw threaded, a tube having the end spread and bearing at the outer face of such spread end on the shoulder, a compressible packing of rubber tubing on the tube, a tubular nut having a male screw-threaded portion also on the tube, for engaging the parts and making a tight joint, substantially as described.

2. A union or coupling joint consisting of a part having larger longitudinal openings in its ends and a transverse partition having a smaller opening connecting them, providing interior shoulders integral with said part, the larger openings being screw threaded, tubes having their ends spread and bearing on said shoulders, compressible packing rings on both tubes and tubular nuts having male screw threaded portions and heads, also on the tubes, for engaging the parts, connecting the tubes and making tight joints, substantially as described.

In testimony whereof I affix my signature in presence of two witnesses.

RICHARD N. OAKMAN.

Witnesses:
M. TURNER,
A. E. QUARTERS.